United States Patent
Pierson et al.

(10) Patent No.: US 9,075,928 B2
(45) Date of Patent: Jul. 7, 2015

(54) HAZARD DETECTION AND ELIMINATION FOR COHERENT ENDPOINT ALLOWING OUT-OF-ORDER EXECUTION

(71) Applicant: Texas Instruments Incorporated, Dallas, TX (US)

(72) Inventors: Matthew D Pierson, Murphy, TX (US); Kai Chirca, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 80 days.

(21) Appl. No.: 14/059,774

(22) Filed: Oct. 22, 2013

(65) Prior Publication Data

US 2014/0115267 A1     Apr. 24, 2014

Related U.S. Application Data

(60) Provisional application No. 61/717,872, filed on Oct. 24, 2012.

(51) Int. Cl.
| | |
|---|---|
| *G06F 12/00* | (2006.01) |
| *G06F 13/42* | (2006.01) |
| *G06F 12/08* | (2006.01) |
| *G06F 13/16* | (2006.01) |
| *H04L 29/06* | (2006.01) |

(52) U.S. Cl.
CPC ............ *G06F 13/42* (2013.01); *G06F 12/0815* (2013.01); *G06F 12/0831* (2013.01); *G06F 13/1626* (2013.01); *G06F 13/1663* (2013.01); *H04L 63/0263* (2013.01); *G06F 12/0828* (2013.01); *Y02B 60/1225* (2013.01)

(58) Field of Classification Search
CPC .......................... G06F 12/0815; G06F 12/0828
See application file for complete search history.

(56) References Cited

U.S. PATENT DOCUMENTS

2013/0103912 A1*  4/2013  Jones et al. ................... 711/144

* cited by examiner

*Primary Examiner* — Zachary K Huson
(74) *Attorney, Agent, or Firm* — Robert D. Marshall, Jr.; Frank D. Cimino

(57) ABSTRACT

A coherence maintenance address queue tracks each memory access from receipt until the memory reports the access complete. The address of each new access is compared against the address of all entries in the queue. This check is made when the access is ready to transmit to the memory. If there is no address match, then the current access does not conflict with any pending access. If there is an address match, the current access is stalled. The multi-core shared memory controller would then typically proceed to another access waiting a slot to the endpoint memory. Stored addresses in the coherence maintenance address queue are retired when the endpoint memory reports completion of the operation. At this point the access is no longer a hazard to following operations.

6 Claims, 6 Drawing Sheets

| 31 ○○○ 29 | 28 | 27 ○○○ 23 | 22 ○○○ 18 | 17 ○○○ 13 | 12 ○○○ 2 | 1 | 0 |
|---|---|---|---|---|---|---|---|
| creg | z | dst | src2 | scr1/cst | opcode | s | p |

HAZARD DETECTION AND ELIMINATION FOR COHERENT ENDPOINT ALLOWING OUT-OF-ORDER EXECUTION

CLAIM OF PRIORITY

This application claims priority under 35 U.S.C. 119(e)(1) to U.S. Provisional Application No. 61/717,872 filed Oct. 24, 2012.

TECHNICAL FIELD OF THE INVENTION

The technical field of this invention is cache for digital data processors.

BACKGROUND OF THE INVENTION

Coherent memory controllers enforce rules on request completion order between masters to allow multiple of these masters to operate on the same data set or within a cache block data set. Maintain coherence required endpoint memory updates to commit in the same order enforced by the coherence controller. Typically the endpoint memory controller sits downstream (after) the coherence controller and implements reordering performance optimizations.

The endpoint memory has a standard master/slave interface with the memory controller and requires all of the proper signals driven to track outstanding accesses. These signals include transaction IDs. Master initiated read and write commands typically are assigned their own IDs. The memory controller must initiate snoop operations to maintain coherence. Sometimes the responses for these include updated data that must be committed to the endpoint memory. This queue also tracks the outstanding IDs given to these memory controller initiated coherence operations and ensures full utilization of all IDs without unnecessary stalling.

A multi-core shared memory controller will typically be employed with memory types that re-order memory accesses to collect accesses to the same page together. Many memories provide faster response when accessing the same page sequentially rather than changing pages. This re-ordering is a problem for a coherent memory system which requires strict ordering to preserve coherence. This invention tracks address hazards to preserve coherence.

SUMMARY OF THE INVENTION

A coherence maintenance address queue tracks each memory access from receipt until the memory reports the access complete. The address of each new access is compared against the address of all entries in the queue. On an address match, the access is stalled. Typically this check is made when the access is ready to transmit to the memory. This may occur after winning arbitration for the access. If there is no address match, then the current access does not conflict with any pending access. The multi-core shared memory controller transmits this access to the endpoint memory. If there is an address match, the current access is stalled. The multi-core shared memory controller would then typically proceed to another access waiting a slot to the endpoint memory. The stalled access takes part in arbitration for a slot during the next cycle.

Stored addresses in the coherence maintenance address queue are retired when the endpoint memory reports completion of the operation. At this point the access is no longer a hazard to following operations. The coherence maintenance address queue will no longer stall followings accesses to this address. If an access had been stalled, it will be allowed to complete upon retirement of the prior blocking access.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
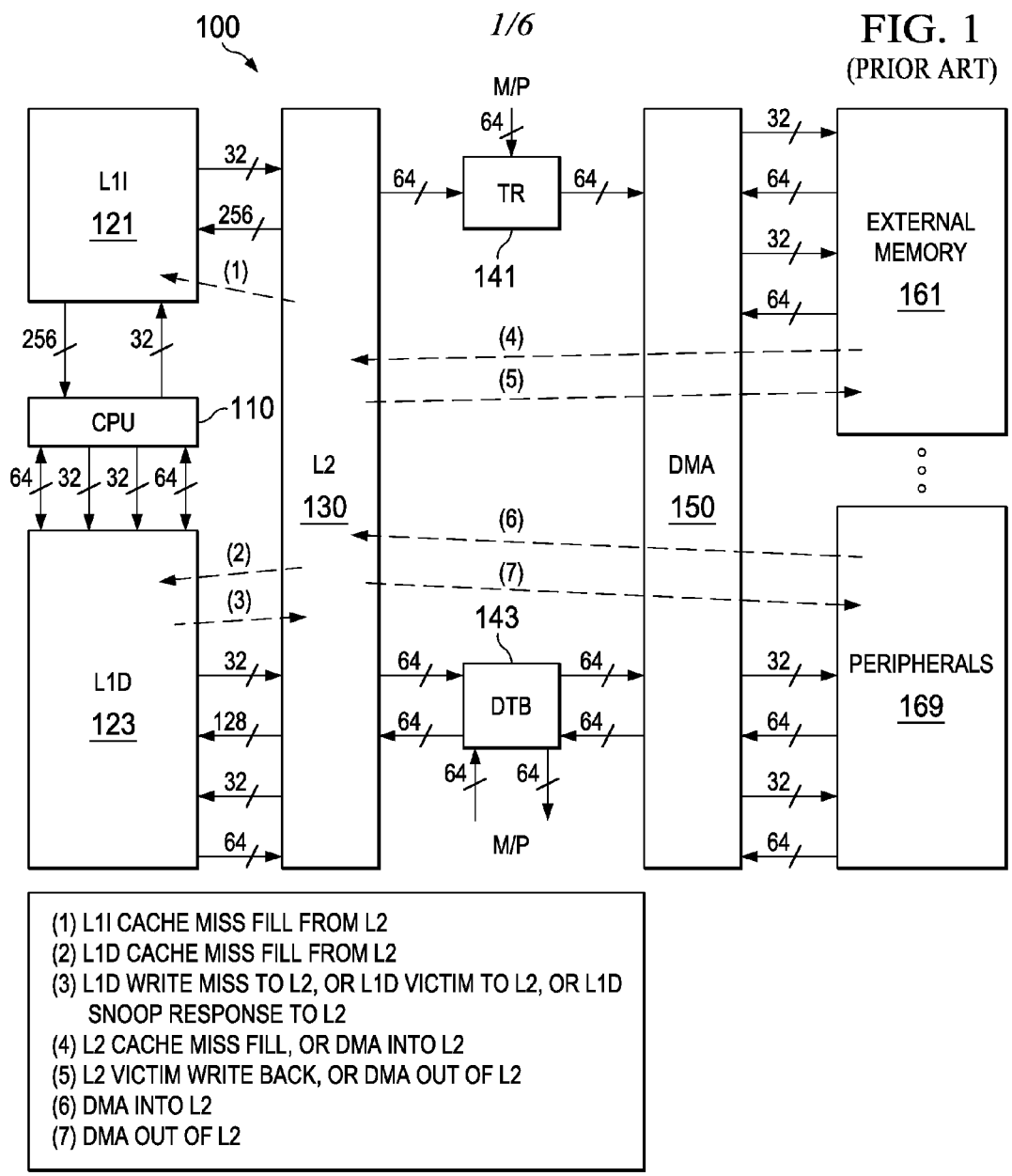
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

Figure 2:
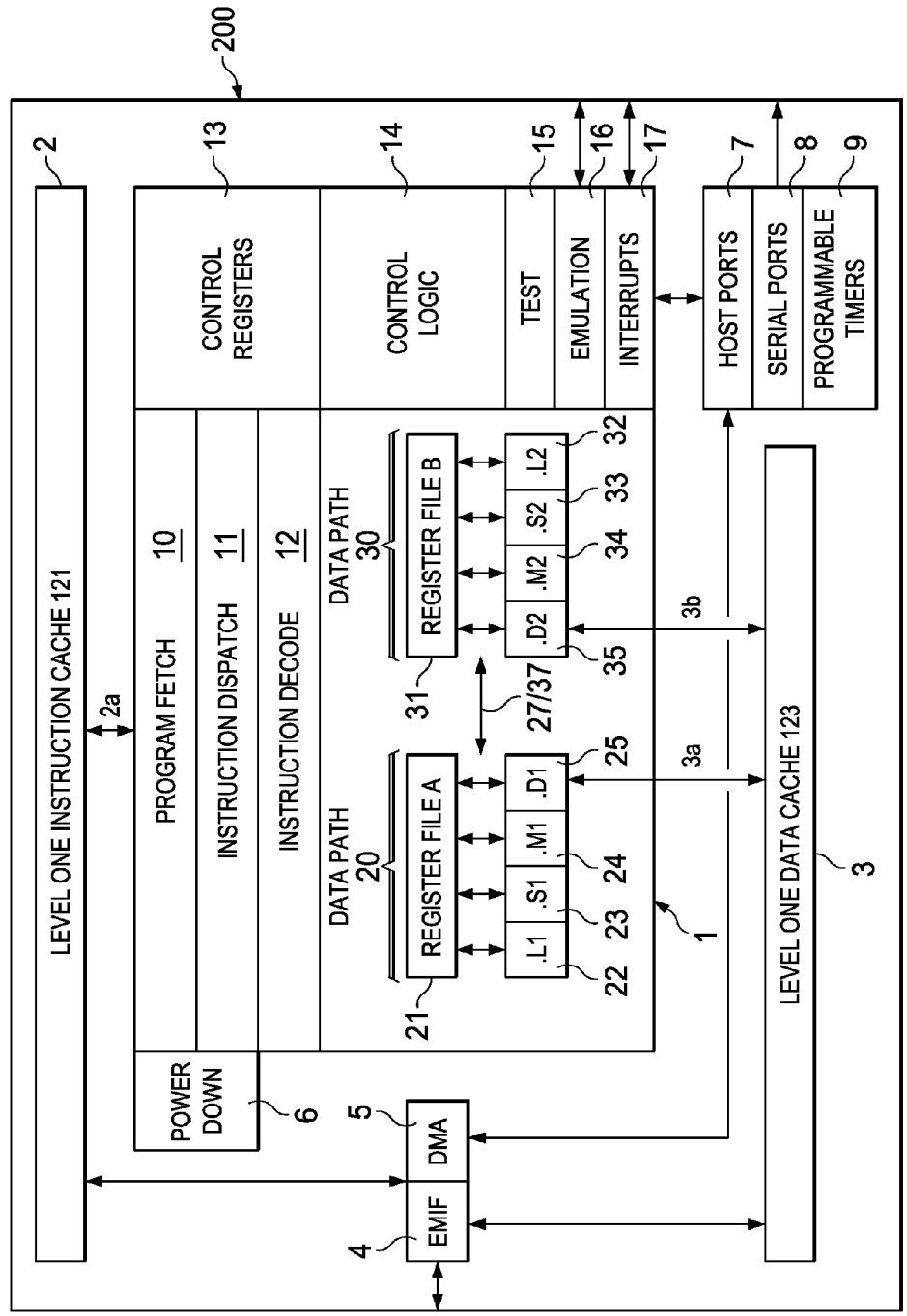
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports $3a$ and $3b$. Each internal port $3a$ and $3b$ preferably has 32 bits of data and a 32-bit byte address reach. Level one instruction cache 121 may be internally accessed by central processing unit 1 via a single port $2a$. Port $2a$ of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
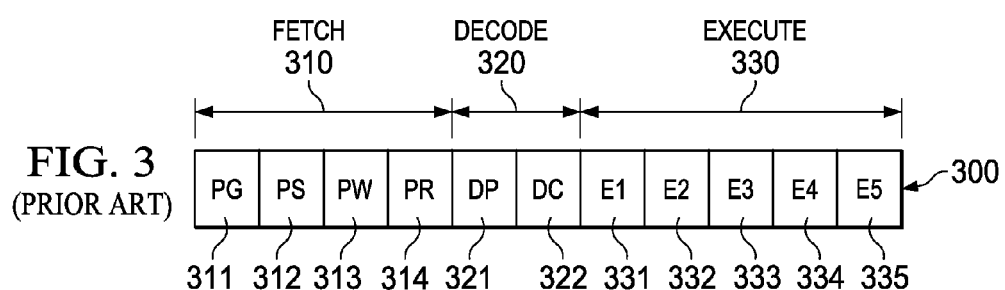
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331 the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
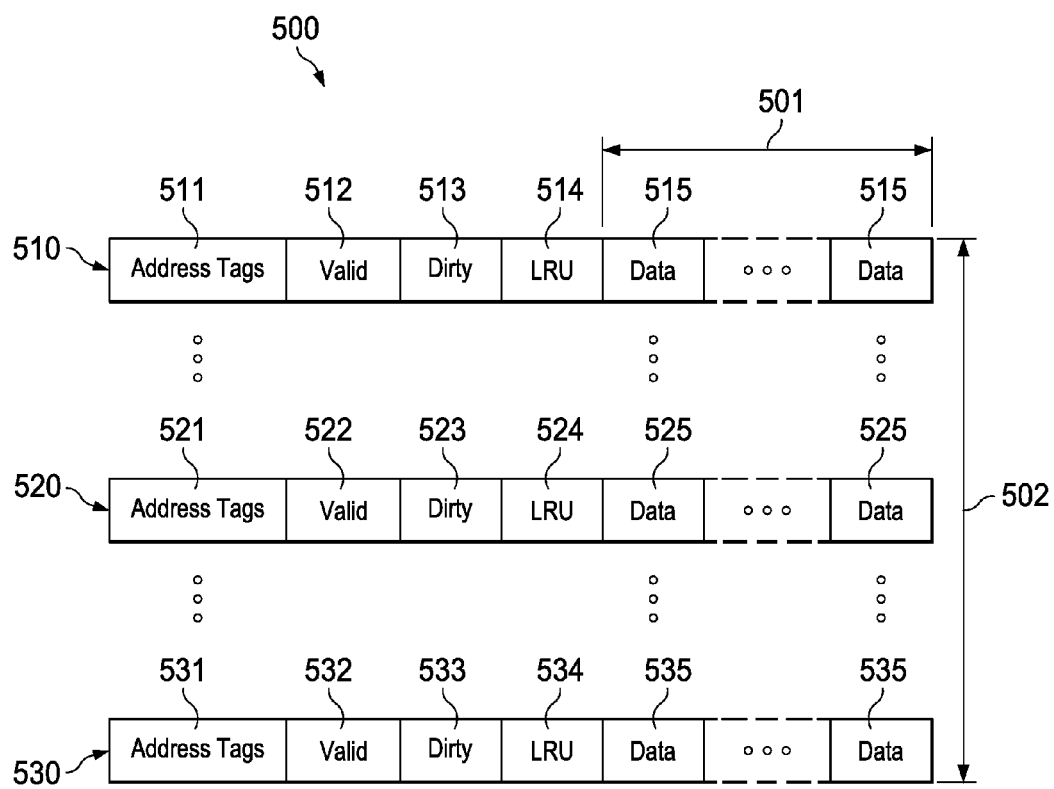
FIG. 4 illustrates the instruction syntax of the very long instruction word digital signal processor core illustrated in FIG. 2 (prior art)
FIG. 5 illustrates the details of a set of typical prior art cache lines (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
| --- | --- | --- | --- | --- |
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the details of plural cache lines such as used in L1I cache 121, L1D cache 123 and L2 cache 131 illustrated in FIG. 1. Cache 500 illustrated in FIG. 5 includes cache lines 510, 520 and 520 are representative of the internal structure of cache 500. Each of cache lines 510, 520 and 530 includes: respective address tags 511, 521 and 522; respective valid bits 512, 522 and 523; respective dirty bits 513, 523 and 533; respective least recently used (LRU) indicators 514, 524 and 534; and respective data words 515, 525 and 535. Each cache line 510, 520 and 530 includes plural respective data words 515, 525 and 535. The bit length of data words 515, 525 and 535 is set by the minimal addressable data amount of CPU 110. This is typically 8 bits/1 byte.

Cache 500 stores data from more distant memories such as external memory 131 which are accessed by a multi-bit address. Cache 500 is organized to facilitate this storage and to facilitate finding such data in the cache. Each cache line 510, 520 and 530 typically stores $2^N$ respective data words 515, 525 and 535, when N is an integer. The position of data words 515, 525 and 535 within the corresponding cache line 510, 520 and 530 along the dimension 501 serves as a proxy for the least significant bits of the address.

The position of cached data within lines along dimension 502 serves as a proxy for the next most significant bits of the address. The corresponding address tags 511, 521 and 531 form the remainder of the data word address. To determine if a memory access is to data cached within cache 500 (a cache hit), cache 500 compares the address tags for all cache lines to the most significant bits of the memory location accessed. Upon a detecting a match, the position within the cache line along dimension 501 corresponds to the least significant bits of the address permitting identification of the data word accessed.

Each data word 510, 520 and 530 includes a corresponding valid bit 512, 522 and 532. A first state of this valid bit indicates the corresponding data words 515, 525 or 535 are valid. An opposite state of this valid bit indicates the corresponding data words 515, 525 or 535 are not valid. There are several instances where data stored within cache 500 would not be valid. Upon initial activation of digital signal processor system 100 the L1I cache 121, L1D 123 cache and L2 cache 131 would not be loaded. Thus they would not store valid data. Accordingly, all cache lines are initially marked invalid. During a cache access a match of a requested address with address tags 511, 521 or 531 would not detect a match unless the corresponding valid bit 512, 522 or 532 indicated the data was valid.

Each data word 510, 520 and 530 includes a corresponding dirty bit 513, 523 and 533. A first state of this valid bit indicates the corresponding data words 515, 525 or 535 are dirty. An opposite state of this valid bit indicates the corresponding data words 515, 525 or 535 are not dirty (clean). Cache memory is generally used for both read accessed and write accesses. Upon a cache hit for a write access, the write data is written into the corresponding location within cache 500. According to the preferred writeback technique, this write data is not immediately forwarded to external memory 131. Instead the respective dirty bit 513, 523 or 533 is set to indicate dirty. A dirty indication means that there has been a write to the cached data not currently reflected in the base memory. According to the writeback technique this data is written to the base memory with the expectation that this writeback can accumulate plural writes to the memory location and nearby memory locations within the same cache line to reduce traffic on the bus to external memory 131.

The least recently used (LRU) bits 514, 524 and 534 are used when a cache line is replaced. Because the cache cannot hold all the data stored in the large, slow memory, the data within the cache must be replaced with new data regularly. Using a data words location within dimensions 501 and 502 as proxy for the least significant bits introduces a problem in locating data within cache 500. If there is only a single cache line having the same location on dimensions 501 and 502, then plural data from the large, slow memory will alias to the same cache line in cache 500. This is data having the same least significant address bits corresponding to dimensions 501 and 502 but differing most significant address bits. An access to such aliased data would require the previous data at that cache line to be replaced. This is considered disadvantageous. A typical prior art cache is set associative. Thus a set of cache lines have the same location on dimensions 501 and 502. Typical sets include two members (two-way set associative) or four members (four-way set associative). Each cache line of such a set is called a way. A cache miss to an address that aliases to one of these sets needs only to evict one of these ways. Determination of which way to evict is typically made based on prior usage of these ways. According to both the temporal and spatial locality principles more recently used cache ways are more likely to be reused than less recently used cache ways. LRU bits 514, 524 and 534 track accesses to cache ways within the set. When data is to be replaced the LRU bits indicate the least recently used way for replacement. Maintaining cache coherence requires writeback of a dirty way upon such replacement.

Figure 6:
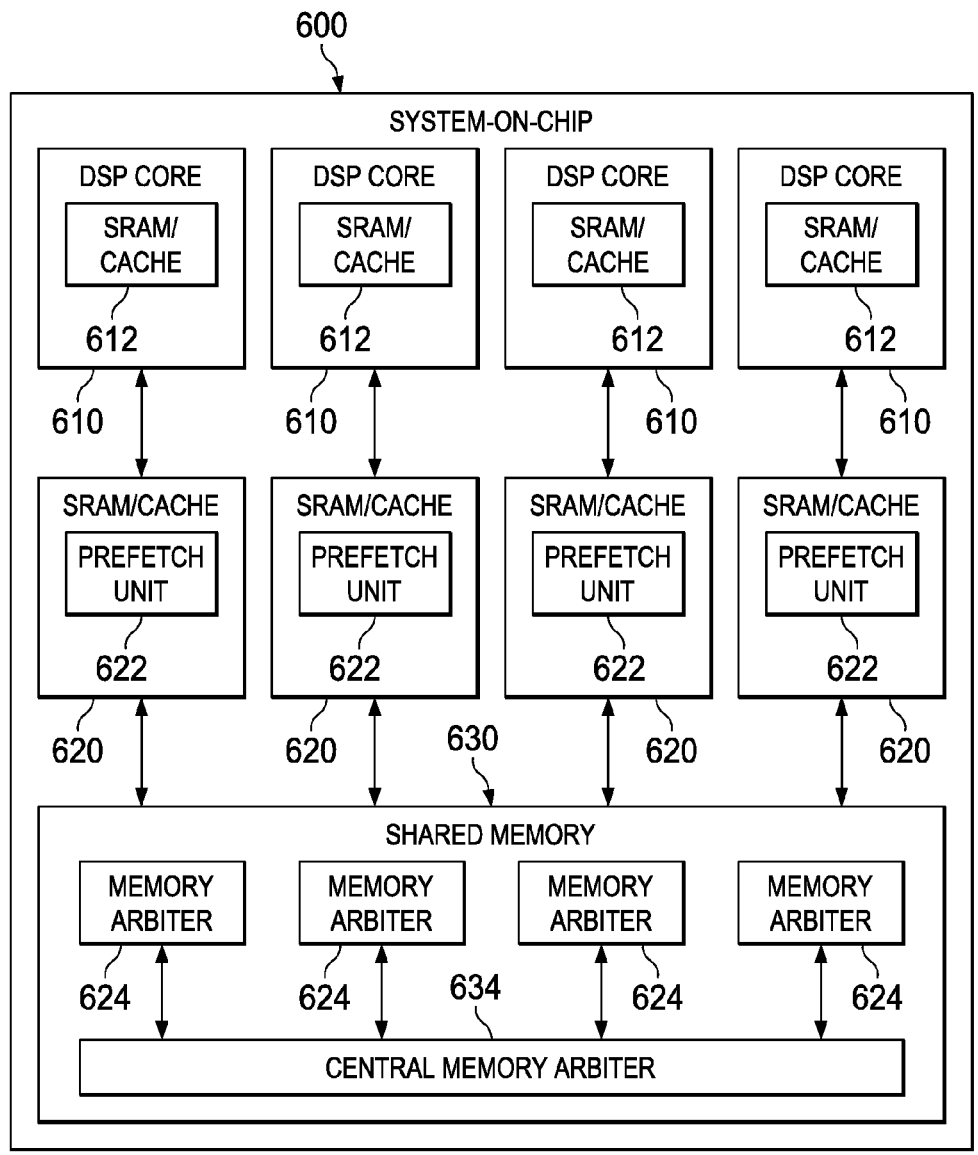
FIG. 6 illustrates a computing system including a local memory arbiter according to an embodiment of the invention.

FIG. 6 is a block diagram illustrating a computing system including a local memory arbiter according to an embodiment of the invention. FIG. 6 illustrates system on a chip (SoC) 600. SoC 600 includes one or more DSP cores 610, SRAM/Caches 620 and shared memory 630. SoC 600 is preferably formed on a common semiconductor substrate. These elements can also be implemented in separate substrates, circuit boards and packages. For example shared memory 630 could be implemented in a separate semiconductor substrate. FIG. 6 illustrates four DSP cores 610, but SoC 600 may include fewer or more DSP cores 610.

Each DSP core 610 preferably includes a level one data cache such as L1 SRAM/cache 612. In the preferred embodiment each L1 SRAM/cache 612 may be configured with selected amounts of memory directly accessible by the corresponding DSP core 610 (SRAM) and data cache. Each DSP core 610 has a corresponding level two combined cache L2 SRAM/cache 620. As with L1 SRAM/cache 612, each L2 SRAM/cache 620 is preferably configurable with selected amounts of directly accessible memory (SRAM) and data cache. Each L2 SRAM/cache 620 includes a prefetch unit 622. Each prefetch unit 622 prefetches data for the corresponding L2 SRAM/cache 620 based upon anticipating the needs of the corresponding DSP core 610. Each DSP core 610 is further coupled to shared memory 630. Shared memory 630 is usually slower and typically less expensive memory than L2 SRAM/cache 620 or L1 SRAM/cache 610. Shared memory 630 typically stores program and data information shared between the DSP cores 610.

In various embodiments, each DSP core 610 includes a corresponding local memory arbiter 624 for reordering memory commands in accordance with a set of reordering rules. Each local memory arbiter 624 arbitrates and schedules memory requests from differing streams at a local level before sending the memory requests to central memory arbiter 634. A local memory arbiter 624 may arbitrate between more than one DSP core 610. Central memory arbiter 634 controls memory accesses for shared memory 630 that are generated by differing DSP cores 610 that do not share a common local memory arbiter 624.

Figure 7:
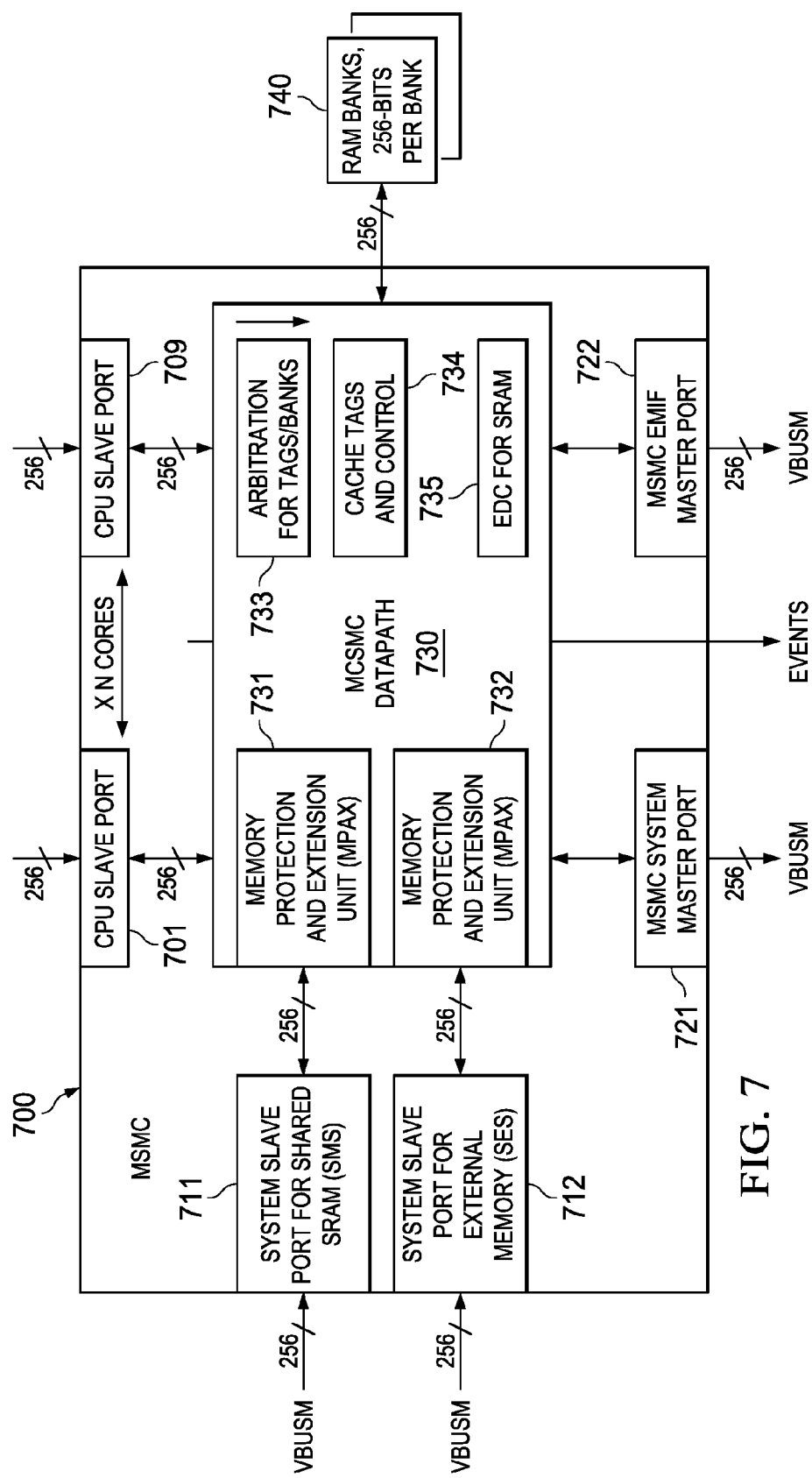
FIG. 7 illustrates the multi-core shared memory controller of this invention.

FIG. 7 illustrates a preferred embodiment of the multi-core shared memory controller of this invention. Multi-core shared memory controller (MSMC) 700 includes; plural slave interfaces for CPU cores 701 to 709; two full VBusM slave interfaces for connections to the SoC interconnect, a first system slave port for shared SRAM (SMS) 711 and a second system slave port for external SRAM (SES) 712; MSMC system master port 721; MSMC external memory interface (EMIF) 722; and MSMC master control data path 730. MSMC master control data path 730 includes: memory protection and extension unit (MPAX) 731 coupled to system slave port for shared SRAM (SMS) 711; and memory protection and extension unit (MPAX) 732 coupled to system slave port for external memory (SES) 712. MSMC master control data path 730 includes: arbitration for tags/banks 733; cache tags and control 734; and error detection and correction (EDC) 735. MSMC master control data path 730 is bidirectionally coupled to RAM banks 740. MSMC 700 controls communication between plural processing cores, external peripherals and memory. In particular MSMC 700 controls memory operations to maintain coherence when plural processing cores employ the same shared memory.

It is possible that the cache of another processing core stores data for the same address as the evicted data. MSMC 700 initiates a search for such data which is known as a snoop cycle. MSMC 700 transmits the address of the evicted victim to be written to higher level memory to each processing core that may cache this data. The snooped processing core can make three snoop responses. A Not Cached snoop response indicates the responding processing core does not store the data. A Cached and Clean snoop response indicates the responding core stores the data but it is unchanged by that processing core. A Cached and Dirty response indicates the responding core stores that data and has changed it since the data was last written to the shared memory. No coherence action is required for a Not Cached or a Cached and Clean snoop response. If the snoop response is Cached and Dirty, then the two versions of the data (the coherence write data and the cached dirty data noted in the snoop response) must be reconciled. This reconciliation is possible by storing the coherence write data pending the snoop response.

MSMC 700 will typically be employed with memory types that re-order memory accesses to collect accesses to the same page together. Many memories provide faster response when accessing the same page sequentially rather than changing pages. This re-ordering is a problem for a coherent memory system which requires strict ordering to preserve coherence. This invention tracks address hazards to preserve coherence.

A coherence maintenance address queue tracks each memory access from receipt until the memory reports the access complete. The address of each new access is compared against the address of all entries in the queue. On an address match, the access is stalled. Typically this check is made when the access is ready to transmit to the memory. This may occur after winning arbitration for the access. If there is no address match, then the current access does not conflict with any pending access. MSMC 700 transmits this access to the endpoint memory. If there is an address match, the current access is stalled. MSMC 700 would then typically proceed to another access waiting a slot to the endpoint memory. The stalled access takes part in arbitration for a slot during the next cycle.

Stored addresses in the coherence maintenance address queue are retired when the endpoint memory reports completion of the operation. At this point the access is no longer a hazard to following operations. The coherence maintenance address queue will no longer stall followings accesses to this address. If an access had been stalled, it will be allowed to complete upon retirement of the prior blocking access.

Figure 8:
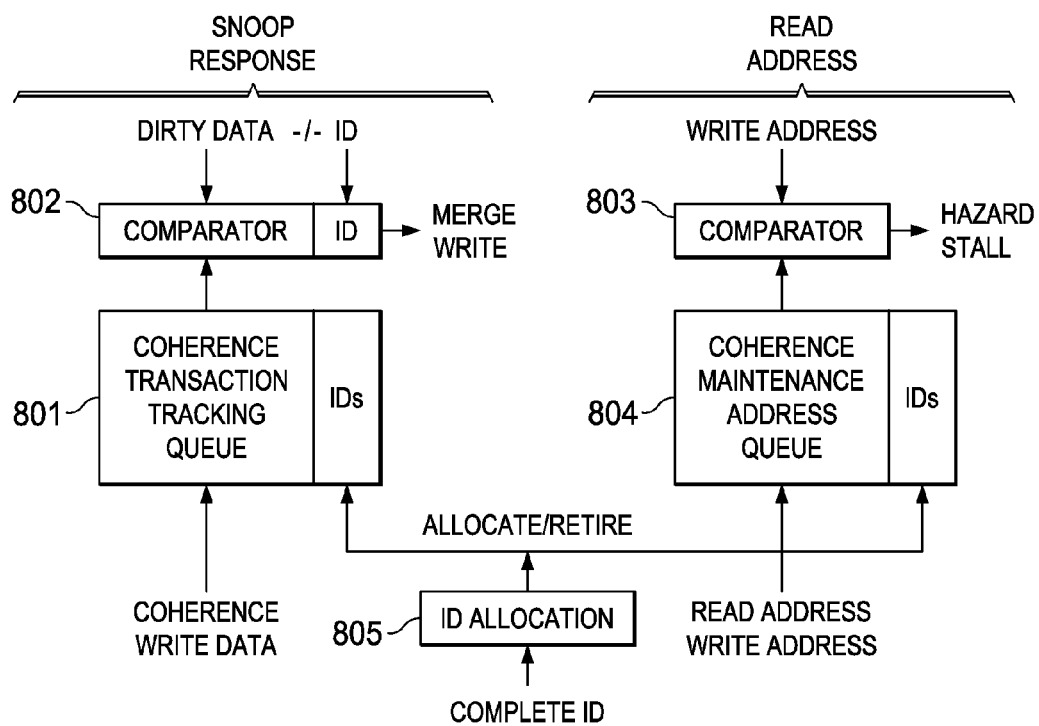
FIG. 8 illustrates a detail of one embodiment of a portion of the multi-core shared memory controller of constructed to practice this invention.

FIG. 8 illustrates a detail of one embodiment of a portion of MSMC 700 constructed to practice this invention. Note that conventional parts needed for a practical embodiment are omitted for clarity. The following description mentions access addresses. It is known in the art that these addresses need not be the complete endpoint memory address. a number of least significant bits of these addresses could be truncated so that the addresses refer to a larger quantity of data such as a whole cache line.

FIG. 8 illustrates coherence data for a coherence write operation. A coherence write operation includes a non-allocated write and a cache line eviction. Upon a cache miss, a processing core may allocate a cache line to store the data of the memory access generating the cache miss. This cache line is one way of a set corresponding to the memory access address. If the cache line to be replaced is dirty, then the dirty data must be written out to the next level memory. This process is called a victim eviction.

MSMC 700 immediately commits the coherence write operation to the endpoint memory. Coherence transaction tracking queue 801 stores the data of this write operation and an assigned ID tag. In a preferred embodiment, the whole data is not stored but only write enable strobes corresponding to the cache dirty tags. Operation with this variation is further explained below.

ID allocation block 805 allocates an identifier to this queue entry. In the preferred embodiment this identifier is a 4-bit ID tag. In the preferred embodiment ID allocation block 805 allocates the lowest unused ID tag rather than using a first-in-first-out scheme. Note that if there are no available ID tags for ID allocation block 805 to assign, then the access stalls until an ID tag is free.

MSMC 700 issues a snoop request to all processing cores that may cache the data of the coherence write. Each snoop request includes the ID tag assigned to the coherence write data queue entry. No merge operation is needed if the snoop response is Not Cached, Cached and Clean or Cached and Dirty where the same coherence write data and snoop data are dirty. Comparator 802 compares the coherence write data in coherence transaction tracking queue 801 having the ID tag of the snoop return. If the snoop return is Cached and Dirty with different dirty data in the snoop return than in the coherence write, then comparator 802 triggers a merge write operation. This merge write operation includes only data dirty in the snoop response and clean in the coherence write. As noted above coherence write data queue may store only the corresponding dirty tags or derived write enable strobes. This data and the snoop return data and the dirty tags corresponding to the snoop data from the other processing core are sufficient to determine the data for the merge write. This is advantageous because the dirty tags or write enable strobes comprise less data to be stored in coherence write data queue than the data itself.

Coherence maintenance address queue 804 stores the address of each endpoint memory access. On transmitting an access to the endpoint memory, ID allocation block 805 allocates an ID tag and opens an entry in coherence maintenance address queue 803. In the preferred embodiment ID allocation block 805 uses the same block of 4-bit ID tags for coherence transaction tracking queue 801 and coherence maintenance address queue 804. As previously described, ID allocation block 805 preferably allocates the lowest unused ID tag.

Comparator 803 compares the addresses of all read or write accesses to the entries of coherence maintenance address queue 804. If the addresses do not match, the access is not stalled. If the addresses match, then comparator 803 stalls the current access. Eventually the blocking entry in coherence maintenance address queue 804 will be retired by completion signal from the endpoint memory. The endpoint memory identifies the completion signal by the corresponding ID tag assigned initially by ID allocation block 805. Thereafter the previously stalled access will no longer be blocked.

This invention solves the reordering problem by borrowing information from the coherence controller pending queue entries. This invention introduces a second queue that tracks cache maintenance operations. This second queue has several advantageous features. This second queue tracks addresses of outstanding coherent cache maintenance operations (such as victims and snoop responses with data) to ensure in-order commit only when a hazard is detected. This second queue tracks endpoint status return to determine when transactions commit to the endpoint memory. This second queue allocates transaction IDs for memory controller initiated snoop command responses. In the preferred embodiment a pool of 16 IDs is allocated from the bottom up with the lowest available ID chosen.

When a coherent transaction or coherent cache maintenance operation wins arbitration for the external endpoint the corresponding address is checked against both the coherence pending queue and the cache maintenance pending queue for address hazards. When a hazard is detected the logic stalls the second transaction until the status returns for the first. This dis-allows reversal of commit order for these interfering transactions. Maintaining correct commit order for transactions having address hazards maintains memory coherence.

This invention includes these features. A cache maintenance only queue is added as additional queue to coherent transaction queue with greater number of entries. This queue has dual use for ID allocation of snoop responses and address based hazarding for coherence. ID tags are allocated in a bottoms up ID fashion assigning the lowest available ID tag. This invention stalls endpoint memory accesses only when an address hazard is detected. Thus the endpoint memory may re-order accesses aggressively to maximize performance for non-overlapping access and non-coherent data.

The cache maintenance queue entries of this invention contain much less hardware than the coherent transaction tracking queue, there can be the maximum number of entries based on total IDs available. This ensures minimization of stalls due to the cache maintenance queue filling up. Dual-purposing the queue for ID allocation and hazard tracking minimizes the amount of hardware needed and for savings in power and complexity. The bottoms up ID allocation allows for maximum use of all ID tags.

What is claimed is:

1. A multi-core shared memory controller for managing memory coherence among a plurality of processing cores which may cache data and a shared memory comprising:
   a plurality of input ports, one corresponding to each one of the plurality of processing cores, for receiving memory access requests to the shared memory including read address, write address and write data from the corresponding processing core;
   a coherence maintenance address queue having a plurality of entries, each entry storing an address of an access request committed to the shared memory and an assigned ID tag;
   an ID allocation block coupled to said coherence maintenance address queue assigning an available ID tag from a set of ID tags to an access committed to the shared memory for storage in said coherence maintenance address queue and retiring a coherence maintenance address queue entry upon receipt of a completion signal from the shared memory indicating completion of the corresponding access; and
   a comparator coupled to said input ports and said coherence maintenance address queue and receiving an address of a memory access request, said comparator comparing the address of the memory access request with all addresses stored in said coherence maintenance address queue and generating a hazard stall signal if the address of the memory access request matches any address stored in said coherence maintenance address queue.

2. The multi-core shared memory controller of claim 1, further comprising:
   a coherence transaction tracking queue having a plurality of entries, each entry storing dirty tags corresponding to coherence write data and an assigned ID tag;
   a comparator connected to said coherence transaction tacking queue and receiving dirty tags corresponding to snoop response data, said comparator determining where snoop response dirty tags indicate dirty and said stored dirty tags indicate clean and inactive elsewhere, said comparator causing a write of received snoop response data that is dirty in the snoop response and clean in the coherence write data to the shared memory; and
   said ID allocation block is further coupled to said coherence transaction tracking queue and operable to assign an available ID tag from said set of ID tags upon creation of an entry within said coherence transaction tracking queue.

3. The multi-core shared memory controller of claim 1, wherein:
   said ID allocation block assigns a lowest available ID tag upon allocating an ID tag.

4. A method of coherence management for a plurality of processing cores which may cache data and a shared memory comprising the steps of:
   storing an address of an access request committed to the shared memory and an assigned ID tag;
   assigning an ID tag from a set of ID tags to an access committed to the shared memory and retiring a stored address upon receipt of a completion signal from the shared memory indicating completion of the corresponding access; and
   comparing an address of a memory access request with all stored addresses; and
   stalling a memory access request if the corresponding matches any stored address.

5. The method of claim 4, further comprising:
   storing dirty tags corresponding to coherence write data and an assigned ID tag;
   comparing dirty tags corresponding to snoop response data with said stored dirty tags;
   writing received snoop response data that is dirty in the snoop response and clean in the coherence write data to the shared memory; and
   assigning an available ID tag from said set of ID tags upon creation of an entry within said coherence transaction tracking queue.

6. The method of claim 5, wherein:
   said step of assigning an ID tag assigns a lowest available ID tag upon allocating an ID tag.

* * * * *